(12) United States Patent
Selstad

(10) Patent No.: US 10,975,776 B2
(45) Date of Patent: Apr. 13, 2021

(54) ADAPTIVE FUEL FLOW ESTIMATION WITH FLOW METER FEEDBACK

(71) Applicant: United Technologies Corporation, Farmington, CT (US)

(72) Inventor: Tyler J. Selstad, West Hartford, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 846 days.

(21) Appl. No.: 15/092,928

(22) Filed: Apr. 7, 2016

(65) Prior Publication Data
US 2017/0292457 A1 Oct. 12, 2017

(51) Int. Cl.
| | |
|---|---|
| F02C 9/26 | (2006.01) |
| F02C 7/232 | (2006.01) |
| F01D 21/00 | (2006.01) |
| F02C 9/44 | (2006.01) |

(52) U.S. Cl.
CPC ............ *F02C 9/263* (2013.01); *F01D 21/003* (2013.01); *F02C 7/232* (2013.01); *F02C 9/44* (2013.01); *F05D 2220/323* (2013.01); *F05D 2260/82* (2013.01); *F05D 2270/306* (2013.01); *F05D 2270/54* (2013.01); *F05D 2270/701* (2013.01); *F05D 2270/71* (2013.01); *F05D 2270/80* (2013.01)

(58) Field of Classification Search
CPC .... F02C 9/263; F02C 9/26; F02C 9/44; F02C 7/22; F02C 7/232; F02C 7/236; F02C 9/30; F02C 9/28; F01D 21/003; F05D 2270/306; F05D 2270/54; F05D 2270/701; F05D 2270/71; F05D 2220/323; F05D 2270/82
See application file for complete search history.

(56) References Cited

U.S. PATENT DOCUMENTS

| | | | |
|---|---|---|---|
| 2,917,067 A | 12/1959 | Pearl | |
| 3,108,435 A * | 10/1963 | Chandler | F02C 9/46 60/791 |
| 5,274,996 A * | 1/1994 | Goff | F02C 7/262 60/39.281 |
| 5,305,597 A * | 4/1994 | Snow | F02C 9/26 60/39.281 |
| 5,715,674 A | 2/1998 | Reuter et al. | |
| 2004/0011052 A1 | 1/2004 | Clements | |
| 2005/0043905 A1* | 2/2005 | Vary | F02C 9/26 702/45 |

(Continued)

FOREIGN PATENT DOCUMENTS

EP    3059423 A1    8/2016

OTHER PUBLICATIONS

EP Application No. 16156373.9 Extended European Search Report dated Jul. 12, 2016, 6 pages.

(Continued)

*Primary Examiner* — Gerald L Sung
*Assistant Examiner* — Jacek Lisowski
(74) *Attorney, Agent, or Firm* — Cantor Colburn LLP

(57) ABSTRACT

According to an aspect, a correction factor for a fuel flow of a fuel system of an engine is determined. A nominal fuel flow is determined based on a metering valve stroke. The correction factor is applied to the nominal fuel flow to produce an estimated fuel flow to control combustion in the engine.

18 Claims, 6 Drawing Sheets

(56) References Cited

U.S. PATENT DOCUMENTS

| | | | |
|---|---|---|---|
| 2007/0044768 A1* | 3/2007 | Eick | F02C 7/236 |
| | | | 123/478 |
| 2007/0175449 A1* | 8/2007 | Mahoney | F23K 5/147 |
| | | | 123/454 |
| 2012/0073301 A1* | 3/2012 | Paradise | F02C 7/228 |
| | | | 60/746 |
| 2012/0167594 A1 | 7/2012 | Poisson et al. | |
| 2012/0315152 A1 | 12/2012 | Baker | |
| 2013/0276918 A1 | 10/2013 | Haugsjaahabink | |
| 2014/0069102 A1 | 3/2014 | Satienpoch et al. | |
| 2015/0152790 A1 | 6/2015 | Javelot et al. | |
| 2016/0245188 A1 | 8/2016 | Selstad et al. | |
| 2016/0326967 A1* | 11/2016 | Yamamoto | F02C 9/28 |
| 2017/0138781 A1* | 5/2017 | Adibhatla | F02C 7/232 |

OTHER PUBLICATIONS

EPD Application No. 17193864.0 Extended EP Search Report dated Jun. 20, 2018, 8 pages.
Extended European Search Report for Application No. 17163778.8-1607, dated Aug. 24, 2017 (8 pp.).

* cited by examiner

ADAPTIVE FUEL FLOW ESTIMATION WITH FLOW METER FEEDBACK

BACKGROUND

This disclosure relates to turbine engines, and more particularly to adaptive fuel flow estimation with flow meter feedback.

Fuel systems for gas turbine engines often include a fuel source and one or more pumps to deliver pressurized fuel to a combustor section of an engine. A fuel system typically includes a metering valve downstream of a pump to measure and regulate fuel flow to the combustor section and a bypass fuel line to recirculate fuel from a location between the pump and the metering valve to a location upstream of the pump. A typical fuel system also includes a pressure regulating valve to maintain a fixed differential pressure across the metering valve by controlling the fuel flowing through the bypass fuel line.

A common method of determining fuel flow through the fuel system includes using the position of the metering valve, also referred to as the metering valve stroke, to determine an associated fuel flow by referencing known fuel flow rates for the particular metering valve position values. Calculation or estimation of fuel flow can be performed based on a nearly-constant pressure regulation of the valve across a metering window. However, it can be difficult to accurately characterize many valves to establish the relationship over a long period of time.

BRIEF DESCRIPTION

According to an embodiment, a method includes determining a correction factor for a fuel flow of a fuel system of an engine. A nominal fuel flow is determined based on a metering valve stroke. The correction factor is applied to the nominal fuel flow to produce an estimated fuel flow to control combustion in the engine.

In addition to one or more of the features described above, or as an alternative to any of the foregoing embodiments, further embodiments may include where the correction factor is determined as a difference between a calculated fuel flow and a mass flow meter reading at one or more flight regimes and divided by the calculated fuel flow.

In addition to one or more of the features described above, or as an alternative to any of the foregoing embodiments, further embodiments may include where the correction factor is a vector and the one or more flight regimes comprise ground idle, cruise, and a maximum takeoff power of the engine.

In addition to one or more of the features described above, or as an alternative to any of the foregoing embodiments, further embodiments may include where the correction factor is weighted to apply a greater weighting for the cruise flight regime than the ground idle or the maximum takeoff power flight regimes.

In addition to one or more of the features described above, or as an alternative to any of the foregoing embodiments, further embodiments may include where the correction factor is a weighted value that applies a greater weighting to a previously computed correction factor from a previous flight.

In addition to one or more of the features described above, or as an alternative to any of the foregoing embodiments, further embodiments may include where the correction factor is reset upon installation or replacement of a fuel metering valve and/or a mass flow meter of the fuel system.

In addition to one or more of the features described above, or as an alternative to any of the foregoing embodiments, further embodiments may include where the estimated fuel flow includes an adjustment for fuel density effects.

In addition to one or more of the features described above, or as an alternative to any of the foregoing embodiments, further embodiments may include where the correction factor is determined based on feedback of a past value of the estimated fuel flow.

In addition to one or more of the features described above, or as an alternative to any of the foregoing embodiments, further embodiments may include where a trend of changes in the correction factor over a plurality of flights is monitored to determine a need for a maintenance action or a repair action.

In addition to one or more of the features described above, or as an alternative to any of the foregoing embodiments, further embodiments may include where a trend of the estimated fuel flow as compared to an on-board model with a fuel flow tuner is monitored to determine validity of the correction factor.

According to an embodiment, a fuel system of an engine is provided. The fuel system includes a fuel metering valve, a mass flow meter, and a controller. The controller determines a correction factor for a fuel flow of the fuel system based on one or more readings of the mass flow meter. The controller determines a nominal fuel flow based on a metering valve stroke of the fuel metering valve. The controller applies the correction factor to the nominal fuel flow to produce an estimated fuel flow to control combustion in the engine.

Technical effects include adaptively determining the stroke-to-flow relationship of a fuel metering valve in a fuel delivery system and diagnosing fuel delivery system problems.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Embodiments use flow meter feedback to adaptively learn a relationship between a fuel metering valve stroke and the flow it produces by using flow meter feedback. Embodiments also determine performance trends of the stroke to flow relationship to diagnose hardware and/or system problems in the fuel delivery system. Flow meter feedback cannot typically be used directly as a real-time feedback variable for control due to latency and accuracy issues at certain operating regimes.

Figure 1:
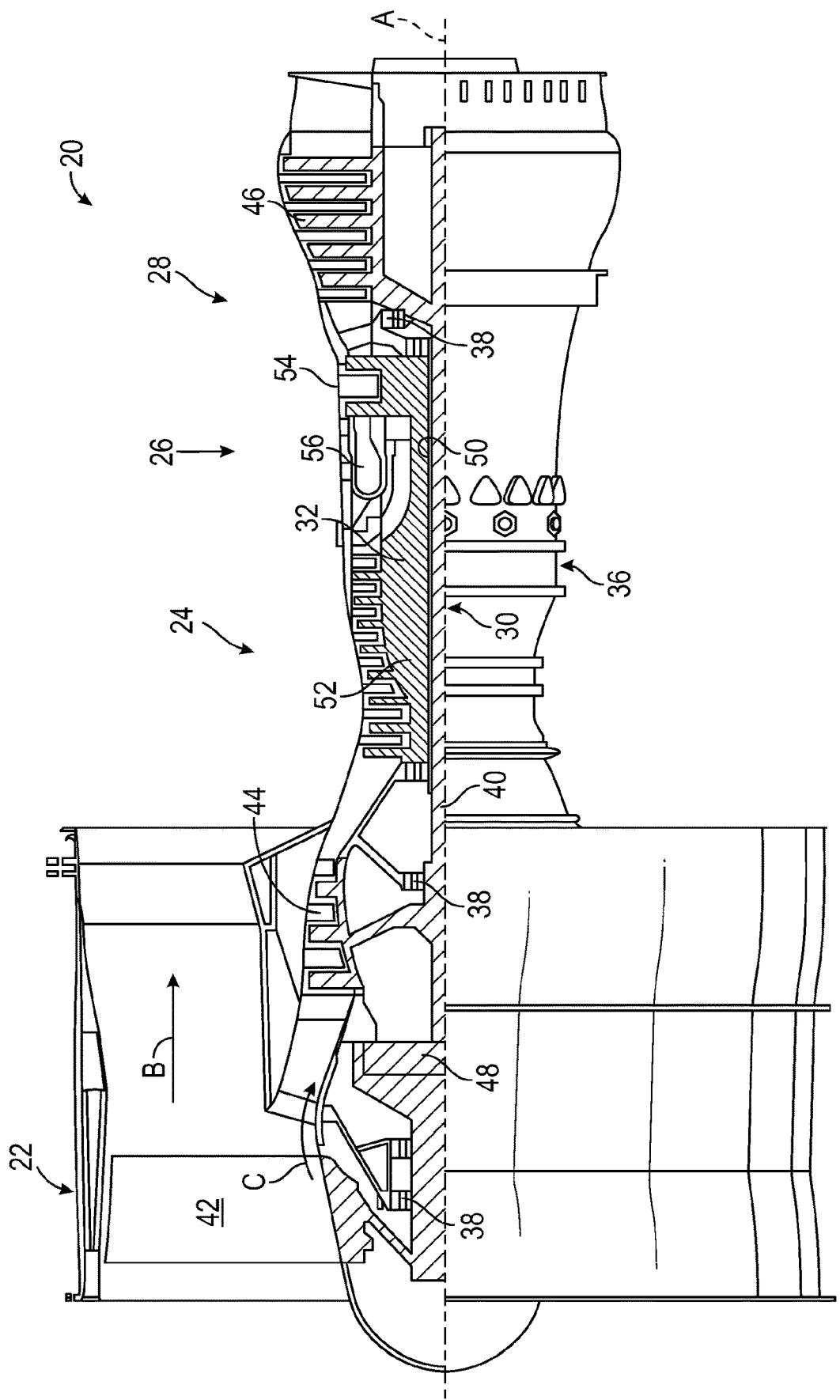
FIG. 1 is a sectional view of one example of a gas turbine engine according to an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °R)/(518.7°\ R)]^{0.5}$. The "Low corrected fan tip speed" as disclosed herein according to one non-limiting embodiment is less than about 1150 ft/second (350.5 m/sec).

Figure 2:
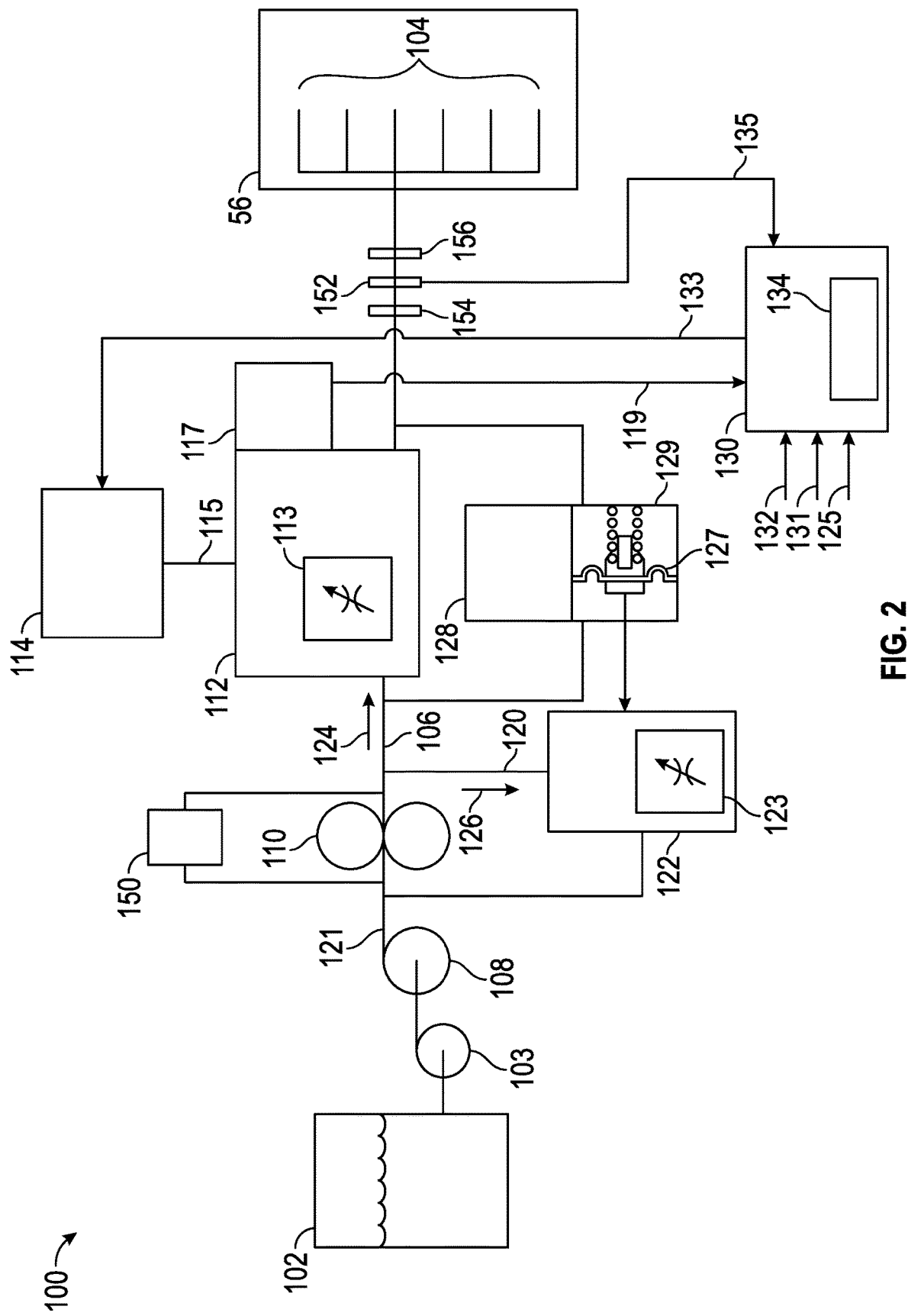
FIG. 2 is a fuel flow schematic for one example of a gas turbine engine according to an embodiment.

Referring now to FIG. 2, a fuel control system 100 for a gas turbine engine in accordance with one embodiment is shown. The system 100 includes a fuel source 102, such as a fuel tank, that stores the fuel supplied to the combustor 56. Fuel is sent through an aircraft booster pump 103 before being sent through an engine booster pump 108. A fuel supply line 106 is coupled to the fuel source 102 and, via various components, delivers the fuel to the combustor 56 via a plurality of fuel nozzles 104. The engine booster pump 108, such as a relatively low horsepower centrifugal pump, and a high pressure fuel pump 110, such as a gear pump or other positive displacement pump, may be used in an embodiment. The pumps 103, 108, 110 are positioned in flow-series in the supply line 106 and draw fuel from the fuel source 102. The engine booster pump 108 provides sufficient suction head for the high pressure pump 110. The fuel pump 110 then supplies the fuel, at a relatively high pressure, such as approximately 1200 psig in one non-limiting example, to the remainder of the supply line 106.

In one or more embodiments, an actuation system 150 receives a flow of fuel from a downstream position of the pump 110 to supply fuel for accessory purposes, such as for providing flow and pressure to fueldraulic engine actuators. The fuel traveling from the actuation system 150 is then routed to a location upstream of the pump 110. As will be explained below, fuel leakage or loss may occur in the actuation system 150 for consideration in determining fuel flow in the fuel control system 100.

A metering valve 112 is positioned in flow-series in the supply line 106 downstream of the fuel pump 110. The metering valve 112 includes a first variable area flow orifice 113 through which a portion of the fuel in the supply line 106 flows. A metering valve control device 114 is used to adjust the position, also referred to as the stroke, of the metering valve 112, and thus the area of the first variable area flow orifice 113. In the embodiment of FIG. 2, the metering valve 112 is a hydraulically-operated valve and the metering valve control device 114 is an electro-hydraulic servo valve (EHSV) that supplies a metering valve control signal output 115. The control signal output 115 from the metering valve control device 114 is coupled to the metering valve 112 and is used to adjust the position of the metering valve 112 by controlling the flow of operational hydraulic fluid to the metering valve 112.

It will be appreciated that the metering valve 112 and control device 114 described above are only exemplary of a particular embodiment, and that each may be implemented using other types of devices. As one non-limiting example, the metering valve 112 may be an electrically operated valve. In this case, a control device 114, such as an EHSV, may not be used, or the control device 114 could be implemented as an independent controller. In any case, as will be described further below, a fuel flow rate to the combustor 56 is controlled by adjusting the position of the metering valve 112, and thus the area of the first variable area flow orifice 113, via the metering valve control device 114.

A metering valve position sensor 117 is coupled to the metering valve 112 and is used to sense the position of the metering valve 112 and supply a metering valve position signal 119. The position of the metering valve 112 is directly related to the area of the first variable area flow orifice 113, which is directly related to the fuel flow rate to the combustor 56, as described below. The position sensor 117 of one embodiment is a dual channel linear variable differential transformer (LVDT). Other embodiments of the position sensor 117 include any one of numerous position sensing devices known in the art. As a non-limiting example, the position sensor 117 may be a rotary variable differential transformer (RVDT).

A bypass fuel line 120 is connected to the supply line 106 between the fuel pump 110 and the metering valve 112. The bypass fuel line 120 bypasses a portion of the fuel in the supply line 106 back to the inlet of the fuel pump 110. It will be appreciated that the present disclosure is not limited to bypassing a portion of the fuel back to the inlet of the fuel pump 110, but also includes embodiments in which the fuel is bypassed back to the inlet of the booster pump 108, back to the fuel source 102, or back to any position upstream from the fuel pump 110. A discharge fuel line 121 is positioned upstream of the bypass fuel line 120.

In the embodiment of FIG. 2, a pressure regulating valve 122 is positioned in flow-series in the bypass fuel line 120, and includes a second variable area flow orifice 123 through which fuel in the bypass fuel line 120 flows. Thus, as indicated by the flow arrows in FIG. 2, a first fraction 124 of the fuel in the supply line 106 is directed through the metering valve 112, and a second fraction 126 is directed through the pressure regulating valve 122. In the embodiment of FIG. 2, the absolute (and relative) magnitudes of the first fraction 124 and second fraction 126 are controlled by adjusting the areas of the first 113 and the second 123 variable area flow orifices.

The position of the pressure regulating valve 122, and thus the area of the second variable area flow orifice 123, is adjusted under the control of a pressure differential sensor 128. The pressure differential sensor 128 is configured to sense the differential pressure ($\Delta P$) between the inlet and outlet of the metering valve 112. The pressure differential sensor 128, which is coupled to the pressure regulating valve 122, adjusts the area of the second variable area flow orifice 123 based on the sensed $\Delta P$. In particular, the pressure differential sensor 128, implementing proportional control, adjusts the area of the second variable area flow orifice 123 to maintain a substantially constant, predetermined $\Delta P$ across the metering valve 112. In one embodiment, the pressure regulating valve 122 and the pressure differential sensor 128 are combined as a single valve structure.

It will be appreciated that the pressure regulating valve 122 and the pressure differential sensor 128 may be any one of numerous types of valves or sensors known in the art. In one embodiment, the pressure differential sensor 128 and the pressure regulating valve 122 are integrally formed as a thermally-compensated, spring-loaded spool valve. In one embodiment, the pressure differential sensor 128 is coupled to the pressure regulating valve 122 and includes a diaphragm 127 across which the metering valve differential pressure is applied. A spring 129 disposed on one side of the diaphragm 127. The selection of the pressure regulating valve 122 or the pressure differential sensor 128 may be dependent on the fuel system 100 arrangement.

Additionally, one or more embodiments of the present disclosure includes a mass flow meter 152, minimum pressure shut off valve 154, and a flow divider valve 156 in flow-series downstream from the metering valve 112.

A controller 130, which may be implemented within a gas turbine engine controller, such as a Full Authority Digital Engine Controller (FADEC) or other electronic engine controller (EEC), controls the flow of fuel to the combustor 56. To do so, the controller 130 receives various input signals and controls the fuel flow rate to the combustor 56 accordingly. In particular, the controller 130 receives an input control signal 132 from, for example, throttle control equipment (not illustrated) in the cockpit, the position signal 119 from the position sensor 117, a compressor discharge pressure signal 131 representative of the discharge pressure from the compressor section 24 in the engine 20, and an ambient pressure signal 125 representative of ambient pressure around the system 100. The controller 130 also receives a mass flow meter feedback signal 135 from the mass flow meter 152, as well as other signals (not depicted). The controller 130, in response to these signals, supplies a drive signal 133 to the metering valve control device 114. In response to the drive signal 133, the metering valve control device 114, as was described above, adjusts the area of the first variable area flow orifice 113 to obtain the desired flow rate to the combustor 56. Memory 134 of the controller 130 stores values, algorithms, maps, and other reference data for calculation and/or retrieval by the controller 130 and other components of the system 100. One of ordinary skill will recognize that, in one or more embodiments of the present disclosure, common software control and evaluation operations such as calculating, receiving, sending, referencing, and determining are steps conducted by the controller 130 with or without using data stored in the memory 134.

The controller 130 includes one or more processors that can be any type of central processing unit (CPU), including a microprocessor, a digital signal processor (DSP), a microcontroller, an application specific integrated circuit (ASIC), a field programmable gate array (FPGA), or the like. Also, in embodiments, the memory 134 may include random access memory (RAM), read only memory (ROM), or other electronic, optical, magnetic, or any other computer readable medium onto which is stored data and algorithms in a non-transitory form. The controller 130 can include other interfaces (not depicted), such as various communication interfaces, input/output interfaces, power supplies, and the like.

Figure 3:
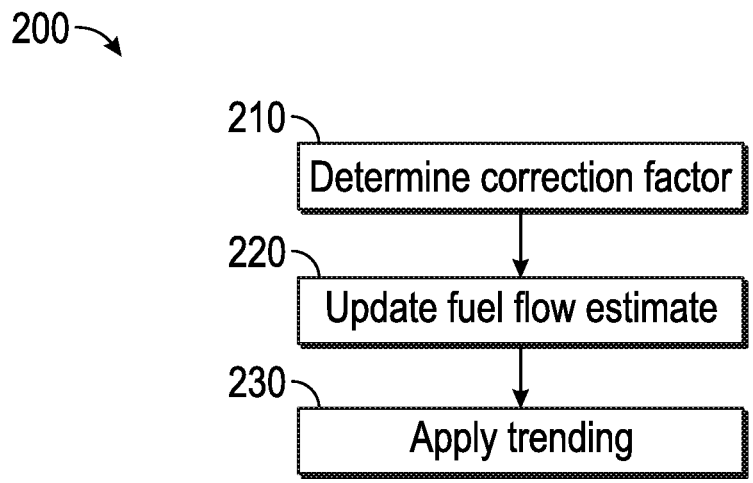
FIG. 3 illustrates an adaptive fuel flow process according to an embodiment.

FIG. 3 illustrates an adaptive fuel flow process 200 according to an embodiment. At block 210, a correction factor is determined to adjust a nominal stroke to flow curve of the metering valve 112 of FIG. 2. Upon startup, the controller 130 of FIG. 2 reads a correction factor (which may be a scalar or vector) that represents the percentage correction (positive or negative) that is applied to a nominal calculation of fuel flow. The correction factor can be obtained by sampling steady state values of the mass flow meter 152 of FIG. 2 and a controller-calculated value of burn flow. A percentage delta (i.e., a correction factor) can be obtained from a single value (i.e., at ground idle, cruise, or maximum takeoff power) or multiple values (at all operating regimes). The percentage delta can be stored in the memory 134 of FIG. 2 for use later. To prevent the correction factor from changing drastically from flight-to-flight, a weighted average of the percentage delta can be used with respect to previous values as an adjusted correction factor.

At block 220, a fuel flow estimate is updated to better estimate the value of burn flow. A single scalar can be used to multiply a resulting stroke-to-flow map in order to correct the value of fuel flow based on feedback from the mass flow meter 152 of FIG. 2. Flow meter feedback alone is not typically used directly because of inherently slow dynamics.

At block 230, trending can be applied by monitoring how much correction is needed over a period of time. For instance, trends of increased correction that exceed a threshold or rate of change can be monitored to determine a service or repair schedule of the fuel metering valve 112 and/or mass flow meter 152 of FIG. 2. By monitoring how much correction needs to be applied to a calculated fuel flow vs. an on-board model with a fuel flow tuner, an additional check is provided to determine whether the mass flow meter 152 is going bad, which can be used to prevent the correction from being applied with respect to a failing mass flow meter.

Figure 4:
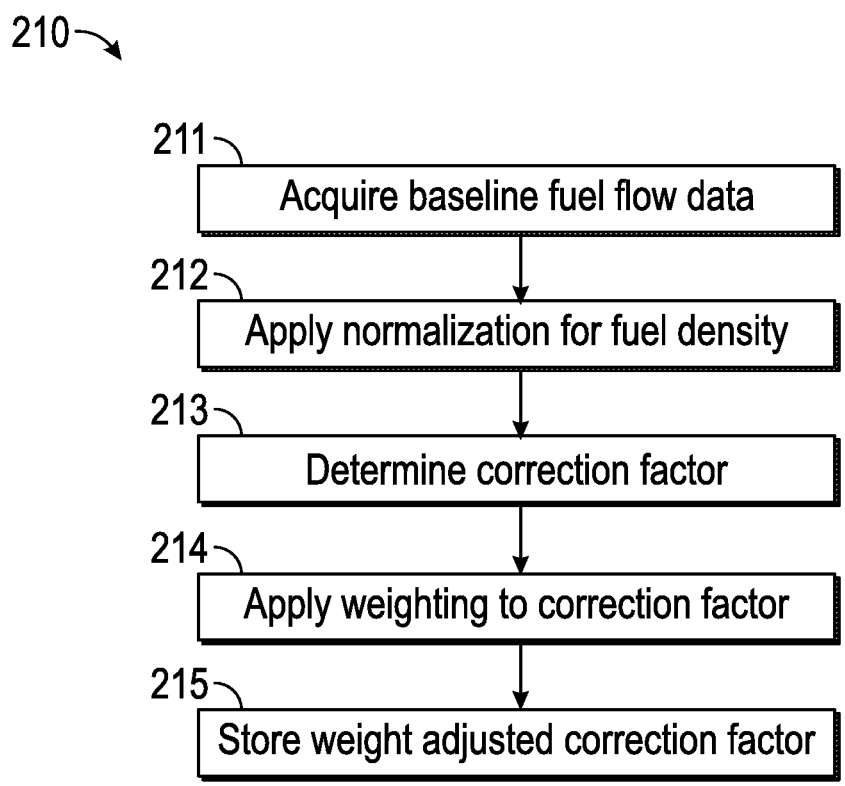
FIG. 4 illustrates a correction factor determination process according to an embodiment.

FIG. 4 illustrates a correction factor determination process according to an embodiment of block 210 of FIG. 3. At block 211, baseline fuel flow data is acquired. An initial value of the correction factor can be zeroed when the fuel metering valve 112 and/or mass flow meter 152 of FIG. 2 is replaced. During flights, fuel flow values that are received from the fuel metering valve 112 and calculated by the controller 130 can be monitored at one or more flight regimes, such as ground idle, cruise, and maximum takeoff power. At block 212, normalization for fuel density effects is applied. At block 213, a correction factor (e.g., a delta percentage) is determined. A stroke-to-flow mapping can be compared with a mass flow meter reading to determine one or more difference values, for instance, at ground idle, cruise, and maximum takeoff power. Alternatively, a single average or blended difference value can be used rather than maintaining multiple difference values at different flight regimes. The correction factor can be tracked as a percentage equal to the difference between the controller-calculated fuel flow and the mass flow meter reading divided by the controller-calculated fuel flow and multiplied by 100%. At block 214, a weighting can be applied to the correction factor. The separate weightings for each flight regime can be maintained or a single weighting can be applied. In one embodiment, the weight adjusted correction factor is equal to 1/20 of the new correction factor plus 19/20 of the old correction factor. In another embodiment, the weight adjusted correction factor equals half of the correction factor at cruise plus a quarter of the correction factor at ground idle plus a quarter of the correction factor at maximum takeoff power. At block 215, a weight adjusted correction factor (or factors) can be stored for future use in non-volatile memory.

Figure 5:
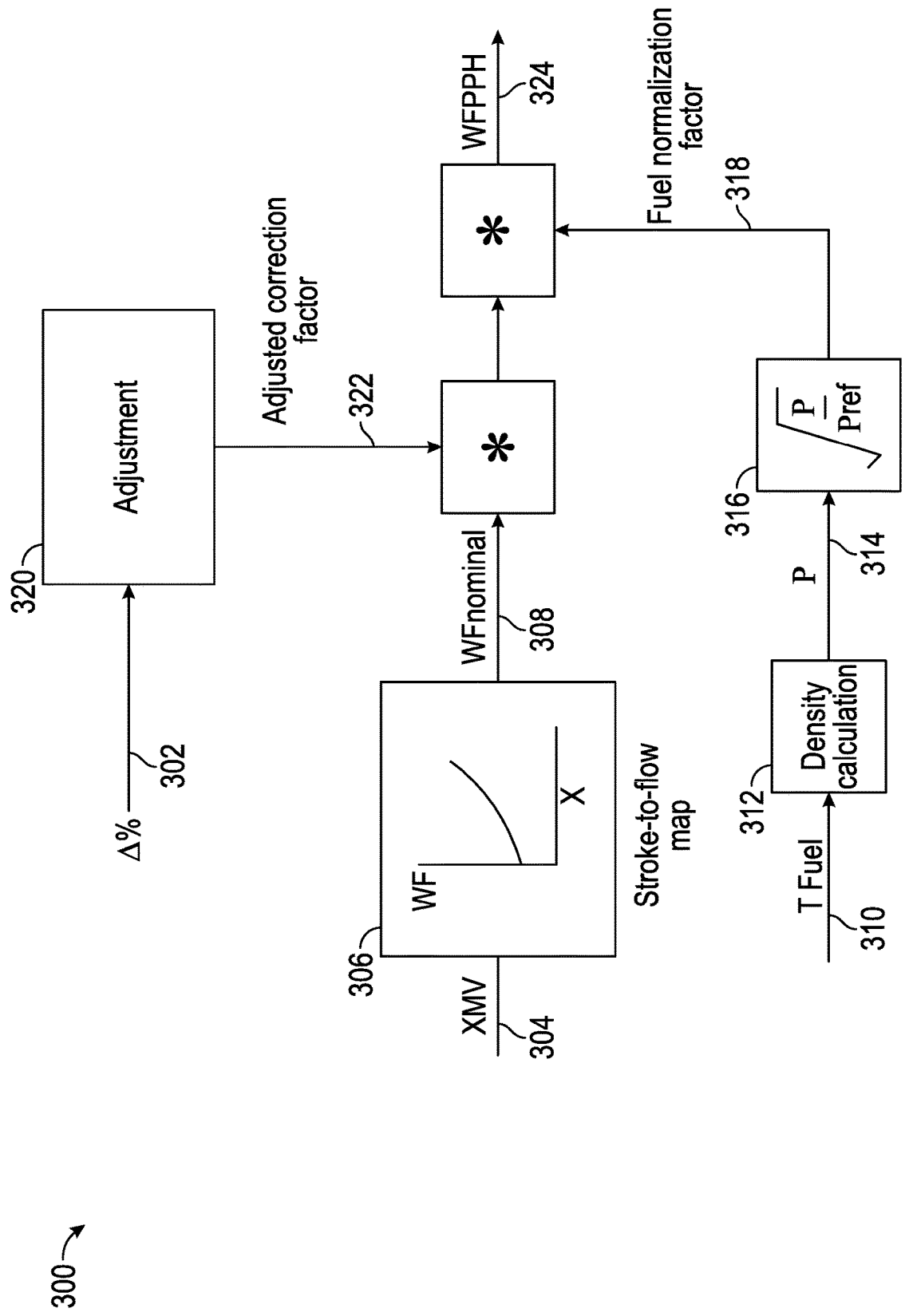
FIG. 5 depicts a fuel flow estimation dataflow according to an embodiment.

FIG. 5 depicts a fuel flow estimation dataflow 300 according to an embodiment where a single (scalar) correction factor 302 is used. The correction factor 302 can be read from memory 134 of FIG. 2 and computed as described in reference to FIG. 4. A metering valve stroke (Xmv) 304 of the fuel metering valve 112 of FIG. 2 can be used as a lookup value in a stroke-to-flow map 306 to determine a nominal fuel flow (WFnominal) 308. A fuel temperature value (Tfuel) 310 can be input to a density calculation 312 to determine a fuel density ($\rho$ 314 that is normalized 316 to produce a fuel normalization factor 318. The correction factor 302 may be applied in an adjustment 320, for instance, to apply a weighting or offset (e.g., one minus correction factor 302) to produce an adjusted correction factor 322. The adjustment 320 can adjust for temperature or density effects on a sampled reading. For instance, stroke-to-flow values in the stroke-to-flow map 306 may be referenced to a fuel density of about 80 degrees F. (26.7 degrees C.), while on-engine samples are typically acquired for much higher fuel temperatures during engine operation. An estimated fuel flow (WFPPH) 324 (i.e., fuel flow in pounds per hour) can be computed as the product of the nominal fuel flow 308, the adjusted correction factor 322, and the fuel normalization factor 318. The estimated fuel flow 324 can be used by the controller 130 of FIG. 2 for control laws that manage fuel flow through fuel nozzles 104 of FIG. 2.

Figure 6:
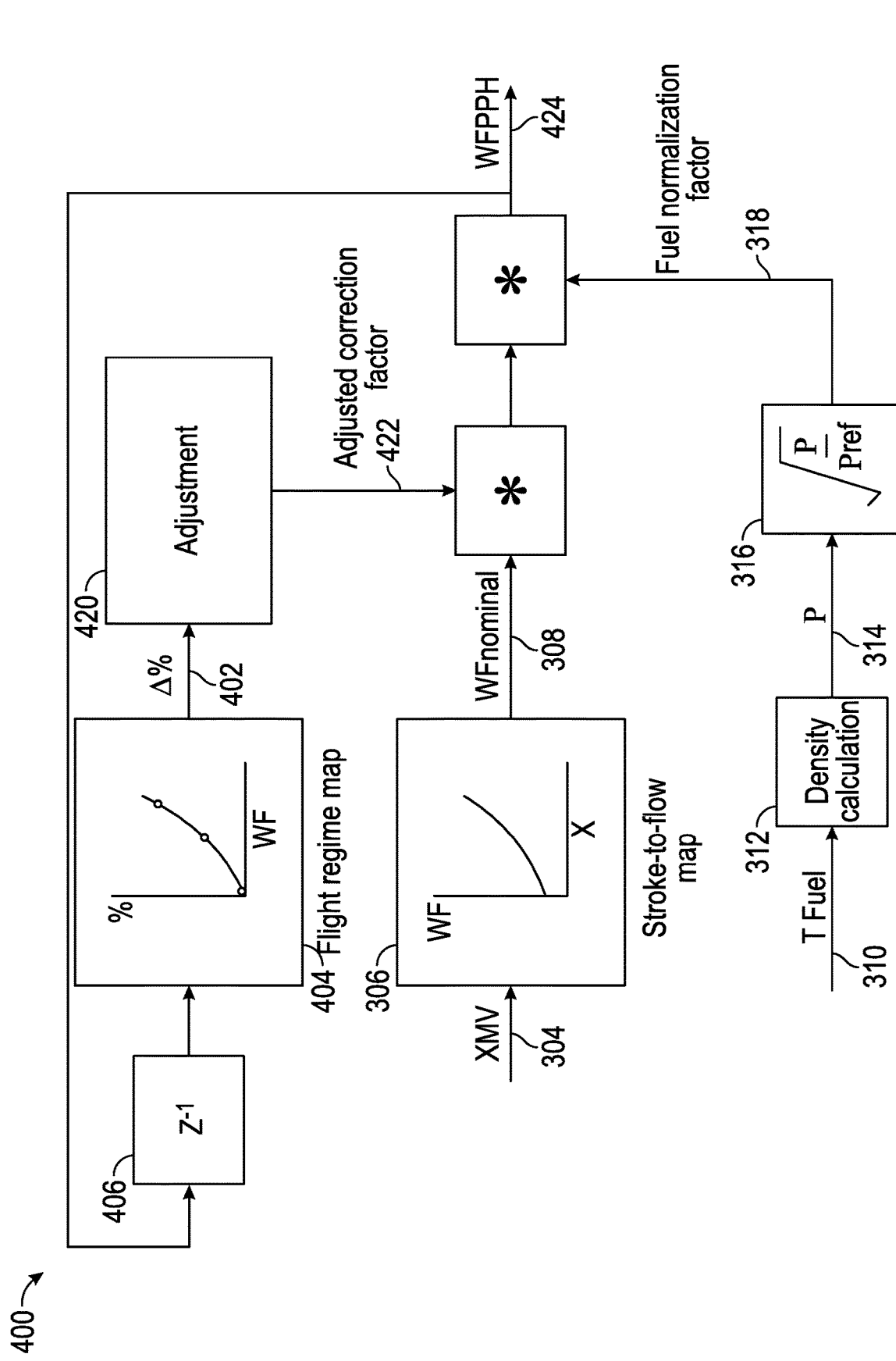
FIG. 6 depicts a fuel flow estimation dataflow according to another embodiment.

FIG. 6 depicts a fuel flow estimation dataflow 400 according to another embodiment. Similar to the fuel flow estimation dataflow 300 of FIG. 5, the fuel flow estimation dataflow 400 of FIG. 6 uses metering valve stroke (Xmv) 304 of the fuel metering valve 112 of FIG. 2 as a lookup value in stroke-to-flow map 306 to determine a nominal fuel flow (WFnominal) 308. Fuel temperature value (Tfuel) 310 can be input to density calculation 312 to determine fuel density ($\rho$ 314 that is normalized 316 to produce fuel normalization factor 318. A correction factor 402 can be determined based on a flight regime map 404 that selects a value for the correction factor 402 based on a past value 406 of estimated fuel flow (WFPPH) 424 (i.e., fuel flow pounds per hour). The flight regime map 404 can be constructed from fuel flow data collected at different flight regimes (e.g., ground idle, cruise, maximum takeoff power) from previous flights. Interpolation (such as linear interpolation) can be used to determine the correction factor 402 between data points in the flight regime map 404. The correction factor 402 may be applied in an adjustment 420, for instance, to apply a weighting or offset (e.g., one minus correction factor 402) to produce an adjusted correction factor 422. The adjustment 420 can adjust for temperature or density effects on a sampled/interpolated reading. For instance, stroke-to-flow values in the stroke-to-flow map 306 may be referenced to a fuel density of about 80 degrees F. (26.7 degrees C.), while on-engine samples are typically acquired for much higher fuel temperatures during engine operation. The estimated fuel flow 424 can be computed as the product of the nominal fuel flow 308, the adjusted correction factor 422, and the fuel normalization factor 318. The estimated fuel flow 424 can be used by the controller 130 of FIG. 2 for control laws that manage fuel flow through fuel nozzles 104 of FIG. 2.

Figure 7:
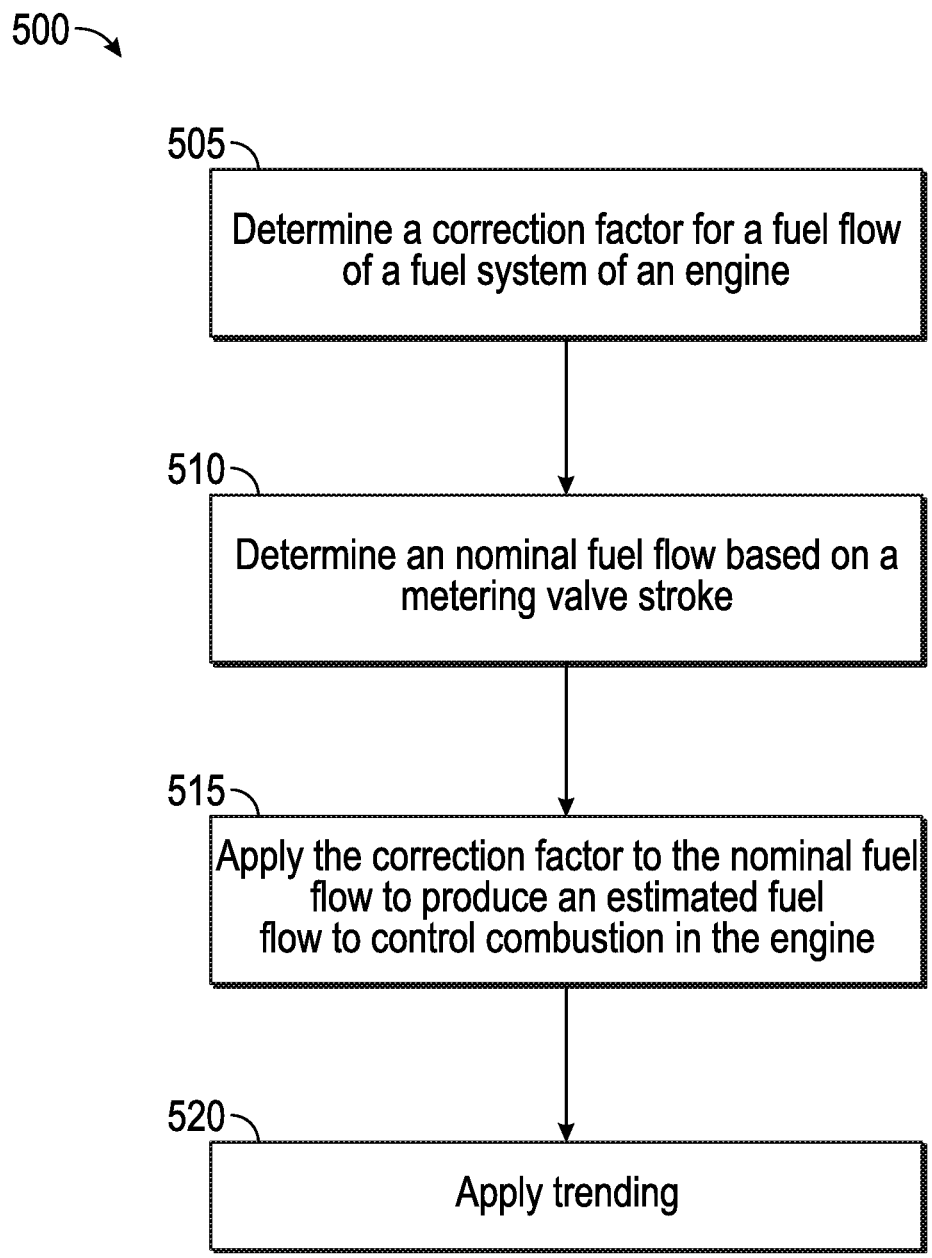
FIG. 7 depicts a fuel flow estimation process according to an embodiment.

FIG. 7 depicts a fuel flow estimation process 500 according to an embodiment. At block 505, a correction factor for a fuel flow of a fuel system of an engine is determined. The correction factor can be determined as a difference between a calculated fuel flow and a mass flow meter reading at one or more flight regimes and divided by the calculated fuel flow. The correction factor can be a vector and the one or more flight regimes include ground idle, cruise, and a maximum takeoff power of the engine. The correction factor can be weighted to apply a greater weighting for the cruise flight regime than the ground idle or the maximum takeoff power flight regimes. The correction factor can be a weighted value that applies a greater weighting to a previously computed correction factor from a previous flight. The correction factor can be reset upon installation or replacement of a fuel metering valve and/or a mass flow meter of the fuel system. Further, the correction factor can be determined based on feedback of a past value of the estimated fuel flow.

At block 510, a nominal fuel flow is determined based on a metering valve stroke. At block 515, the correction factor is applied to the nominal fuel flow to produce an estimated fuel flow to control combustion in the engine. The estimated fuel flow can include an adjustment for fuel density effects.

At block 520, trending is applied. A trend of changes in the correction factor over a plurality of flights can be monitored to determine a need for a maintenance action or a repair action. A trend of the estimated fuel flow as compared to an on-board model with a fuel flow tuner can be monitored to determine validity of the correction factor.

The terminology used herein is for the purpose of describing particular embodiments only and is not intended to be limiting of the embodiments. While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method comprising:
   receiving, at a controller, a position signal from a metering valve position sensor of a fuel metering valve of a fuel system of an engine, wherein the position signal is indicative of a metering valve stroke and relates an area of a variable area flow orifice with a nominal fuel flow to a combustor of the engine;
   receiving, at the controller, one or more readings of a mass flow meter between the fuel metering valve and the combustor of the engine;
   determining, by the controller, the nominal fuel flow based on the metering valve stroke;
   determining, by the controller, a correction factor for a fuel flow of the fuel system of the engine based on the one or more readings of the mass flow meter, wherein the correction factor is determined based on a difference between the nominal fuel flow and at least one of the one or more readings of the mass flow meter obtained at steady state, and the correction factor is weighted to apply a greater weighting to a previously computed correction factor from a previous flight to limit a change rate of the correction factor from flight-to-flight as a weight adjusted correction factor;
   determining, by the controller, an estimated fuel flow to control combustion in the engine based on the weight adjusted correction factor; and
   adjusting, by the controller, a metering valve control device coupled to the fuel metering valve to modify the nominal fuel flow to the combustor based on the estimated fuel flow.

2. The method of claim 1, wherein the correction factor is determined at one or more flight regimes.

3. The method of claim 2, wherein the correction factor is a vector and the one or more flight regimes comprise ground idle, cruise, and a maximum takeoff power of the engine.

4. The method of claim 3, wherein the weight adjusted correction factor is further weighted to apply the greater weighting for the cruise flight regime than the ground idle or the maximum takeoff power flight regimes.

5. The method of claim 1, wherein the correction factor is reset upon installation or replacement of the fuel metering valve and/or the mass flow meter of the fuel system.

6. The method of claim 1, wherein the nominal fuel flow is further adjusted for fuel density effects.

7. The method of claim 1, wherein the correction factor is determined based on feedback of a past value of an adjustment to the nominal fuel flow.

8. The method of claim 1, further comprising:
   monitoring a trend of changes in the correction factor over a plurality of flights to determine a need for a maintenance action or a repair action.

9. The method of claim 1, wherein a trend of adjustment to the nominal fuel flow as compared to an on-board model with a fuel flow tuner is monitored to determine validity of the correction factor.

10. A fuel system of an engine, the fuel system comprising:
   a fuel metering valve comprising a variable area flow orifice;
   a metering valve position sensor coupled to the fuel metering valve;
   a metering valve control device coupled to the fuel metering valve;
   a mass flow meter between the fuel metering valve and a combustor of the engine; and
   a electric controller configured to:
   receive a position signal from the metering valve position sensor, wherein the position signal is indicative of a metering valve stroke and relates an area of the variable area flow orifice with a nominal fuel flow to the combustor of the engine;
   receive one or more readings of the mass flow meter;
   determine the nominal fuel flow based on the metering valve stroke of the fuel metering valve;
   determine a correction factor for a fuel flow of the fuel system based on one or more readings of the mass flow meter, wherein the correction factor is determined based on a difference between the nominal fuel flow and at least one of the one or more readings of the mass flow meter obtained at steady state, and the correction factor is weighted to apply a greater weighting to a previously computed correction factor from a previous flight to limit a change rate of the correction factor from flight-to-flight as a weight adjusted correction factor;
   determine an estimated fuel flow to control combustion in the engine based on the weight adjusted correction factor; and
   adjust the metering valve control device to modify the nominal fuel flow to the combustor based on the estimated fuel flow.

11. The fuel system of claim 10, wherein the correction factor is determined at one or more flight regimes.

12. The fuel system of claim 11, wherein the correction factor is a vector and the one or more flight regimes comprise ground idle, cruise, and a maximum takeoff power of the engine.

13. The fuel system of claim 12, wherein the weight adjusted correction factor is further weighted to apply the greater weighting for the cruise flight regime than the ground idle or the maximum takeoff power flight regimes.

14. The fuel system of claim 10, wherein the correction factor is reset upon installation or replacement of the fuel metering valve and/or the mass flow meter of the fuel system.

15. The fuel system of claim 10, wherein the nominal fuel flow is further adjusted for fuel density effects.

16. The fuel system of claim 10, wherein the correction factor is determined based on feedback of a past value of an adjustment to the nominal fuel flow.

17. The fuel system of claim 10, wherein a trend of changes in the correction factor over a plurality of flights is monitored to determine a need for a maintenance action or a repair action.

18. The fuel system of claim 10, wherein a trend of adjustment to the nominal fuel flow as compared to an on-board model with a fuel flow tuner is monitored to determine validity of the correction factor.

* * * * *